US010859731B2

(12) United States Patent
Averbuch et al.

(10) Patent No.: US 10,859,731 B2
(45) Date of Patent: Dec. 8, 2020

(54) METHOD AND APPARATUS FOR GENERATING AN INTERPOLATED WEATHER FORECAST REPORT

(71) Applicant: HERE GLOBAL B.V., Eindhoven (NL)

(72) Inventors: Alex Averbuch, Buffalo Grove, IL (US); Leon Stenneth, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 493 days.

(21) Appl. No.: 15/675,354

(22) Filed: Aug. 11, 2017

(65) Prior Publication Data

US 2019/0049625 A1 Feb. 14, 2019

(51) Int. Cl.
```
G01W 1/10      (2006.01)
G06Q 10/04     (2012.01)
G01W 1/06      (2006.01)
G01W 1/12      (2006.01)
```

(52) U.S. Cl.
CPC ............... G01W 1/10 (2013.01); G01W 1/06 (2013.01); G06Q 10/04 (2013.01); *G01W 1/12* (2013.01)

(58) Field of Classification Search
CPC .................................. G06Q 10/04; G01W 1/10
See application file for complete search history.

(56) References Cited

U.S. PATENT DOCUMENTS

| | | | | |
|---|---|---|---|---|
| 6,360,172 B1 * | 3/2002 | Burfeind | ................ | G06Q 30/02 455/414.4 |
| 6,498,987 B1 * | 12/2002 | Kelly | .................... | G06Q 30/02 702/3 |
| 6,603,405 B2 * | 8/2003 | Smith | .................. | G08G 1/0962 340/601 |
| 6,826,481 B2 * | 11/2004 | Root | ....................... | G01W 1/00 702/3 |
| 6,845,324 B2 * | 1/2005 | Smith | ................... | G08B 21/10 702/3 |

(Continued)

FOREIGN PATENT DOCUMENTS

WO        2016033035 A1      3/2016

OTHER PUBLICATIONS

Parhami, Behrooz, "Voting Algorithms", Dec. 1994, IEEE Transactions on Reliability, vol. 43 No. 4, p. 617-629 (Year: 1994).*

(Continued)

*Primary Examiner* — Stephanie E Bloss
(74) *Attorney, Agent, or Firm* — Ditthavong & Steiner, P.C.

(57) ABSTRACT

An approach is provided for interpolating weather forecast reports for a forecast location having limited weather station access. The approach involves segmenting a plurality of weather forecast reports according to a plurality of segmentation categories, the plurality of segmentation categories representing respective one or more forecast parameters. The approach also involves determining respective values of the plurality of segmentation categories from each of the plurality of weather forecasts. The approach further involves selecting a representative value from the respective values for each of the one or more segmentation categories. The approach further involves combining the representative value for said each of the plurality of segmentation categories to generate an interpolated weather forecast report.

19 Claims, 12 Drawing Sheets

(56) References Cited

U.S. PATENT DOCUMENTS

| | | | |
|---|---|---|---|
| 7,191,064 B1 | 3/2007 | Myers et al. | |
| 7,200,491 B1 | 4/2007 | Rose, Jr. et al. | |
| 8,832,121 B2 * | 9/2014 | Smith et al. | |
| 2004/0010372 A1 * | 1/2004 | Schwoegler | G01W 1/10 702/3 |
| 2006/0178140 A1 * | 8/2006 | Smith | H04M 3/42348 455/427 |
| 2009/0160700 A1 * | 6/2009 | Messer-Yaron | G01W 1/14 342/26 R |
| 2014/0067270 A1 | 3/2014 | Gail et al. | |
| 2016/0061992 A1 | 3/2016 | Miller et al. | |
| 2016/0351059 A1 * | 12/2016 | Gillet | G08G 5/0091 |
| 2017/0238257 A1 * | 8/2017 | Killen | H04W 52/0206 370/311 |

OTHER PUBLICATIONS

Office Action for corresponding European Patent Application No. 18188768.8-1222, dated Sep. 28, 2018, 8 pages.

Mitra et al., "An Atmospheric Instability Derived with MODIS Profile Using Real-Time Direct Broadcast Data Over the Indian Region", Nat Hazards, Apr. 26, 2012, retrieved on Jan. 27, 2017 from http://link.springer.com/article/10.1007/s11069-012-0202-9, pp. 1007-1023.

Office Action for corresponding European Patent Application No. 18188768.8-1222, dated Jul. 6, 2020, 6 pages.

\* cited by examiner

```
▼<TAF>
  ▼<raw_text>
     TAF AMD LEVT 282021Z 2820/2918 24009KT 9999 SCT050 TX17/2915Z
   </raw_text>
   <station_id>LEVT</station_id>
   <issue_time>2016-03-28T20:21:00Z</issue_time>
   <bulletin_time>2016-03-28T20:23:00Z</bulletin_time>
   <valid_time_from>2016-03-28T20:00:00Z</valid_time_from>
   <valid_time_to>2016-03-29T18:00:00Z</valid_time_to>
   <latitude>42.87</latitude>
   <longitude>-2.72</longitude>
   <elevation_m>509.0</elevation_m>
  ▼<forecast>
     <fcst_time_from>2016-03-28T20:00:00Z</fcst_time_from>
     <fcst_time_to>2016-03-29T18:00:00Z</fcst_time_to>
     <wind_dir_degrees>240</wind_dir_degrees>
     <wind_speed_kt>9</wind_speed_kt>
     <visibility_statute_mi>6.21</visibility_statute_mi>
     <sky_condition sky_cover="SCT" cloud_base_ft_agl="5000"/>
   </forecast>
  ▼<forecast>
     <fcst_time_from>2016-03-29T00:00:00Z</fcst_time_from>
     <fcst_time_to>2016-03-29T00:00:00Z</fcst_time_to>
     <change_indicator>TEMPO</change_indicator>
     <probability>40</probability>
     <wind_dir_degrees>360</wind_dir_degrees>
     <wind_speed_kt>10</wind_speed_kt>
     <visibility_statute_mi>2.49</visibility_statute_mi>
     <wx_string>RA</wx_string>
     <not_decoded>TX17/2915Z TN07/2906Z</not_decoded>
     <sky_condition sky_cover="BKN" cloud_base_ft_agl="1400"/>
   </forecast>
   ...
```

239
241
243
237
234

500

510

508

METHOD AND APPARATUS FOR GENERATING AN INTERPOLATED WEATHER FORECAST REPORT

BACKGROUND

Real-time weather services historically have been one of the most popular information services among end users. With tens of thousands of forecast locations to be reported on worldwide, the demand for relevant weather data is increasing. Numerous weather service providers (e.g., governmental providers, commercial providers, crowd-sourced providers, etc.) distribute weather related data to consumers with each providing varying levels of quality (e.g., in terms of accuracy, specificity, etc.). They rely on various sources for relevant forecast data and most often, weather stations placed in operation at target geographic locations. Unfortunately, the number of weather stations available for generating forecasted weather data for the vast number of locations to be reported on is limited.

Some Example Embodiments

Therefore, there is a need for interpolating weather forecast reports for a forecast location having limited weather station access.

According to one embodiment, a computer-implemented method comprises segmenting a plurality of weather forecast reports according to a plurality of segmentation categories, the plurality of segmentation categories representing respective one or more forecast parameters. The method also comprises determining respective values of the plurality of segmentation categories from each of the plurality of weather forecasts. The method further comprises selecting a representative value from the respective values for each of the one or more segmentation categories. The method further comprises combining the representative value for said each of the plurality of segmentation categories to generate an interpolated weather forecast report.

According to another embodiment, an apparatus comprises at least one processor, and at least one memory including computer program code for one or more computer programs, the at least one memory and the computer program code configured to, with the at least one processor, cause, at least in part, the apparatus to segment a plurality of weather forecast reports according to a plurality of segmentation categories, the plurality of segmentation categories representing respective one or more forecast parameters. The apparatus is also caused to determine respective values of the plurality of segmentation categories from each of the plurality of weather forecasts. The apparatus is further caused to select a representative value from the respective values for each of the one or more segmentation categories. The apparatus is further caused to combine the representative value for said each of the plurality of segmentation categories to generate an interpolated weather forecast report.

According to another embodiment, a computer-readable storage medium carries one or more sequences of one or more instructions which, when executed by one or more processors, cause, at least in part, an apparatus to segment a plurality of weather forecast reports according to a plurality of segmentation categories, the plurality of segmentation categories representing respective one or more forecast parameters. The apparatus is also caused to determine respective values of the plurality of segmentation categories from each of the plurality of weather forecasts. The apparatus is further caused to select a representative value from the respective values for each of the one or more segmentation categories. The apparatus is further caused to combine the representative value for said each of the plurality of segmentation categories to generate an interpolated weather forecast report.

According to another embodiment, an apparatus comprises means for segmenting a plurality of weather forecast reports according to a plurality of segmentation categories, the plurality of segmentation categories representing respective one or more forecast parameters. The apparatus also comprises mean for determining respective values of the plurality of segmentation categories from each of the plurality of weather forecasts. The apparatus further comprises means for selecting a representative value from the respective values for each of the one or more segmentation categories. The apparatus further comprises means for combining the representative value for said each of the plurality of segmentation categories to generate an interpolated weather forecast report.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 2A-2D are diagrams illustrating an example process for interpolating weather forecast reports for a forecast location having limited weather station access, according to one embodiment;

DESCRIPTION OF SOME EMBODIMENTS

Examples of a method, apparatus, and computer program for interpolating weather forecast reports for forecast locations having limited weather station access are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
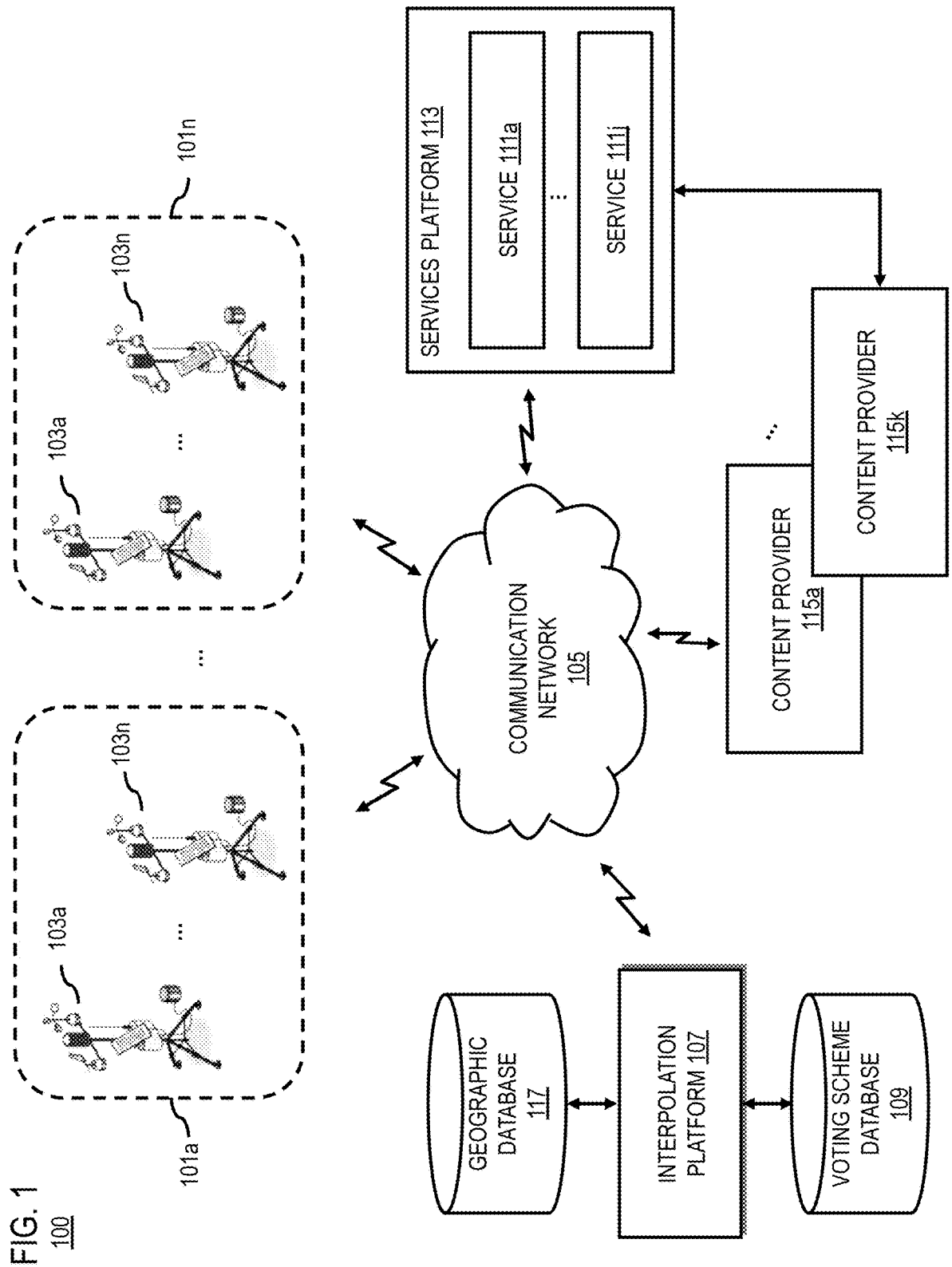
FIG. 1 is a diagram of a system capable of interpolating weather forecast reports for a forecast location having limited weather station access, according to one embodiment.

FIG. 1 is a diagram of a system capable of interpolating weather forecast reports for a forecast location having limited weather station access, according to one embodiment. As noted above, the growing popularity and use of weather data has led to a corresponding increase in the number of weather service or weather data providers to meet the demand for weather data (e.g., current weather condition reports for attributes such as temperature, wind speed, precipitation type, amount of precipitation, atmospheric pressure, ambient light, etc.). While various mobile and crowdsourced weather stations may be employed, many weather service providers rely on weather stations from the National Weather Service (NSW) to acquire the most relevant data for a given forecast location (e.g., a town with a population greater than ten thousand). NSW weather stations are placed in operation at various geographic locations and employ different sensors and data processing approaches to generate forecasted weather data.

Unfortunately, NSW weather stations relied upon to provide weather forecast data for a given forecast location are not always in the exact same location (e.g., separated by several miles). Worldwide, there are tens of thousands of forecast locations to only several thousands of NSW weather stations. Thus, the number of NSW weather stations available is vastly limited relative to the number of forecast locations to be serviced. For this reason, an interpolation scheme is needed to generate weather forecast reports for forecast locations that are without a dedicated weather station.

To address these problems, the system 100 of FIG. 1 introduces the capability to interpolate weather forecast reports for a forecast location having limited weather station access. The embodiments of the system 100 described herein, for instance, advantageously enable weather forecast reports received from weather stations within range of a forecast location of interest to be evaluated and selected for generating a representative weather forecast report; overcoming the limited availability of a weather station for a target forecast location. Additional details of these embodiments of the system 100 are discussed below.

In one embodiment, system 100 of FIG. 1 may include one or more weather service providers 101*a*-101*n* (also collectively referred to as weather service providers 101). Each of the weather service providers 101 can access a respective set of weather stations 103*a*-103*m* (also collectively referred to as weather stations 103) dispersed over a geographical area of coverage. As discussed, weather service providers 101 can vary based on the types of weather stations and/or the locations of the weather stations. For example, there are global weather data providers 101 (e.g., the U.S. National Oceanic and Atmospheric Administration (NOAA), Custom Weather, Iteris, etc.) that use fixed weather stations to provide an estimation of weather for any inputted location. Municipals/states/provinces (e.g., such as the Colorado Department of Transportation (CDOT)) can also have their own personal sets of weather stations 103.

The weather stations 103 include any combination of fixed weather stations (e.g., anchored to a fixed geographic location for providing weather data for that fixed location), such as those provided by the National Weather Service (NSW). National Weather Service weather stations are the most reliable weather station available and are widely used by many providers 101. The weather stations 103 may be installed at locations (e.g., airports, army bases, public buildings, etc.) that are strategically selected so that their observations of the atmospheric condition and other weather data is realistic. For illustrative convenience, the weather stations 103 presented herein are NSW weather stations. However, it is noted that various mobile weather stations (e.g., able to travel within a geographical area to collect weather data at different locations) such as portable devices or vehicles with equipment weather data sensors may also be employed by the service providers 101, such as in conjunction with the weather stations 103, to collect, store and convey relevant weather data.

In one embodiment, the weather stations 103 are equipped with a range of weather sensors for sensing any number of weather attributes or parameters. For example, these sensors include, but are not limited to: (1) thermometer for measure air or surface temperatures, (2) barometer for measuring atmospheric pressure, (3) hygrometer for measuring humidity, (3) anemometer for measuring wind speed, (4) pyranometer for measuring solar radiation, (5) rain gauge for measuring liquid precipitation, (6) precipitation identification sensor for identifying type of falling precipitation, (7) disdrometer for measuring precipitation drop size distribution, (8) transmissometer for measuring visibility, (8) ceilometer for measuring cloud ceiling, and/or the like. It is contemplated that the weather stations 103 can be equipped with any type of weather or environmental sensor known in the art. In one embodiment, the weather stations 103 collect weather data (e.g., weather attribute values) that can be used to characterize current weather conditions and/or predict future weather conditions (e.g., weather forecasts).

In one embodiment, each weather station 103 is assigned a unique identifier (station ID) to facilitate the reporting or transmitting of weather data and/or related probe points (e.g., location data). By way of example, probe points are individual data records collected at a point in time that records telemetry data for that point in time, i.e., probe ID, longitude, latitude, altitude, speed, and/or time. As noted, the weather data and/or probe points can be reported from the weather stations 103 in real-time, in batches, continuously, or at any other frequency requested by a service provider 101 via a communication network 105.

In one embodiment, the weather stations 103 are equipped with logic, hardware, firmware, software, memory, etc. to collect and store weather data measurements for their respective weather sensors continuously, periodically, according to a schedule, on demand, etc. In one embodiment, the logic, hardware, firmware, memory, etc., can be configured to transmit the collected and stored weather data over, for instance, a communication network 105 to an interpolation platform 107, a geographic database 117 accessible to the interpolation platform 107 and/or any other components of the system 100.

In one embodiment, the service providers 101 are configured to interact with an interpolation platform 107 via a communication network 105. The interpolation platform 107 executes various modules for supporting the ability of service providers 101 to generate weather forecast reports despite limited availability of weather stations 103 for a forecast location. As will be discussed further with respect to FIGS. 2A-2D, the interpolation platform 107 performs operations including segmenting a plurality of weather forecast reports received from weather stations 103 within range of the forecast location into categories. The categories may be based on a plurality of forecast parameters. The interpolation platform 107 also evaluates the plurality of weather forecast reports, i.e., based on a voting scheme, and selects a value from each that best represents a weather forecast for a given forecast location. An interpolated weather forecast report is generated based on the selected values.

By way of example, the interpolation platform 107 maintains a voting scheme database 109. The voting scheme database 109 specifies instructions and policies for processing and evaluating weather forecast reports received from weather stations 103. Per the voting scheme database 109, the interpolation platform 107 determines and selects a representative value for use in generating the interpolated weather forecast report. The instructions and policies may include, for example, values and threshold levels for specifying a severe weather occurrence and/or any conditional processing executions. For example, an amount of precipitation or wind speed for a given terrain/location and/or within a specific period may be established as criteria for severe weather classification.

In one embodiment, one or more policies may also be maintained by the voting scheme database 109. For example, a "longest duration" policy may be executed where an event (or value) identified within a weather forecast report is selected by the interpolation platform 107. Under this scenario, when a weather forecast report indicates a sustained period of heavy rainfall, heavy rainfall is automatically selected as the expected weather forecast to occur in the future. Alternatively, a "latest event" policy may be executed where the most recent event (or value) is selected to be the future forecast value. Under this scenario, a recent occurrence of fog and rain is automatically selected as the expected weather forecast to occur in the future.

In one embodiment, the voting scheme database 109 may also specify any number of weather attributes to be extrapolated from a weather forecast report provided by a weather station 103. This may include, but is not limited to temperature, pressure, humidity, precipitation intensity, etc. Still further, the voting scheme database 109 may further indicate specific forecast parameters for segmenting the received weather forecast reports. Exemplary forecast parameters are shown in Table 1 below:

TABLE 1

Intensity (e.g., Light: −, Heavy: +, Vicinity: VC or normal intensity)
Qualifier (e.g., Freezing: FZ, Showers: SH)
Precipitation (e.g., Rain: RA, Snow: SN, SnowGrains: SG)
Obscuration (e.g., Fog: FG, MIST: BR, HAZE: HZ)

FIGS. 2A-2D are diagrams illustrating an example process for interpolating weather forecast reports for a forecast location having limited weather station access, according to one embodiment. The exemplary process is carried out by the interpolation platform 107 in operation with the various service providers 101. In the foregoing embodiments, the service providers 101 execute one or more servers, computing devices, network component and the like (not shown for illustrative convenience) for accessing the weather stations 103 and interacting with the interpolation platform 107.

Figure 2A:
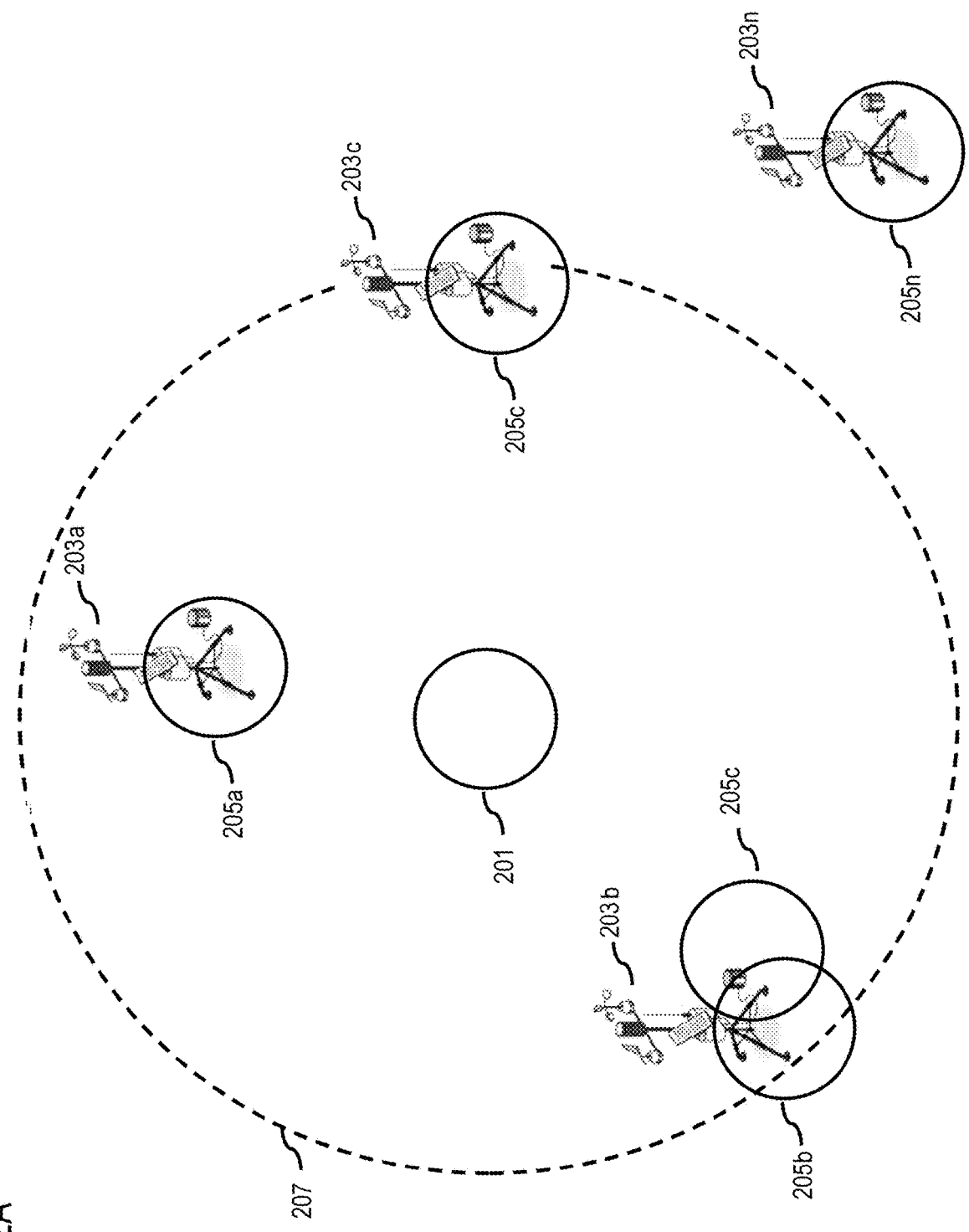

In one embodiment, FIG. 2A illustrates an exemplary forecast location 201 for which a weather service provider 101 requires a weather forecast report. The forecast location 201 is a geographic region, such as a town or city, having a population of at least 10,000. In this example, the forecast location 201 does not have a dedicated weather station. Rather, the forecast location 201 is within range of various other weather stations 203a-203n (also collectively referred to as weather stations 203), corresponding to other forecast locations 205a-205n respectively (also collectively referred to as forecast locations 205). One of the weather stations 203b serves multiple forecast locations 205b and 205c, although generally, the number of forecast locations 205 to be reported upon far exceeds the number of active weather stations 203. Under this scenario, the service provider interacts with the interpolation platform 107 to generate an interpolated weather forecast report.

Figure 2B:
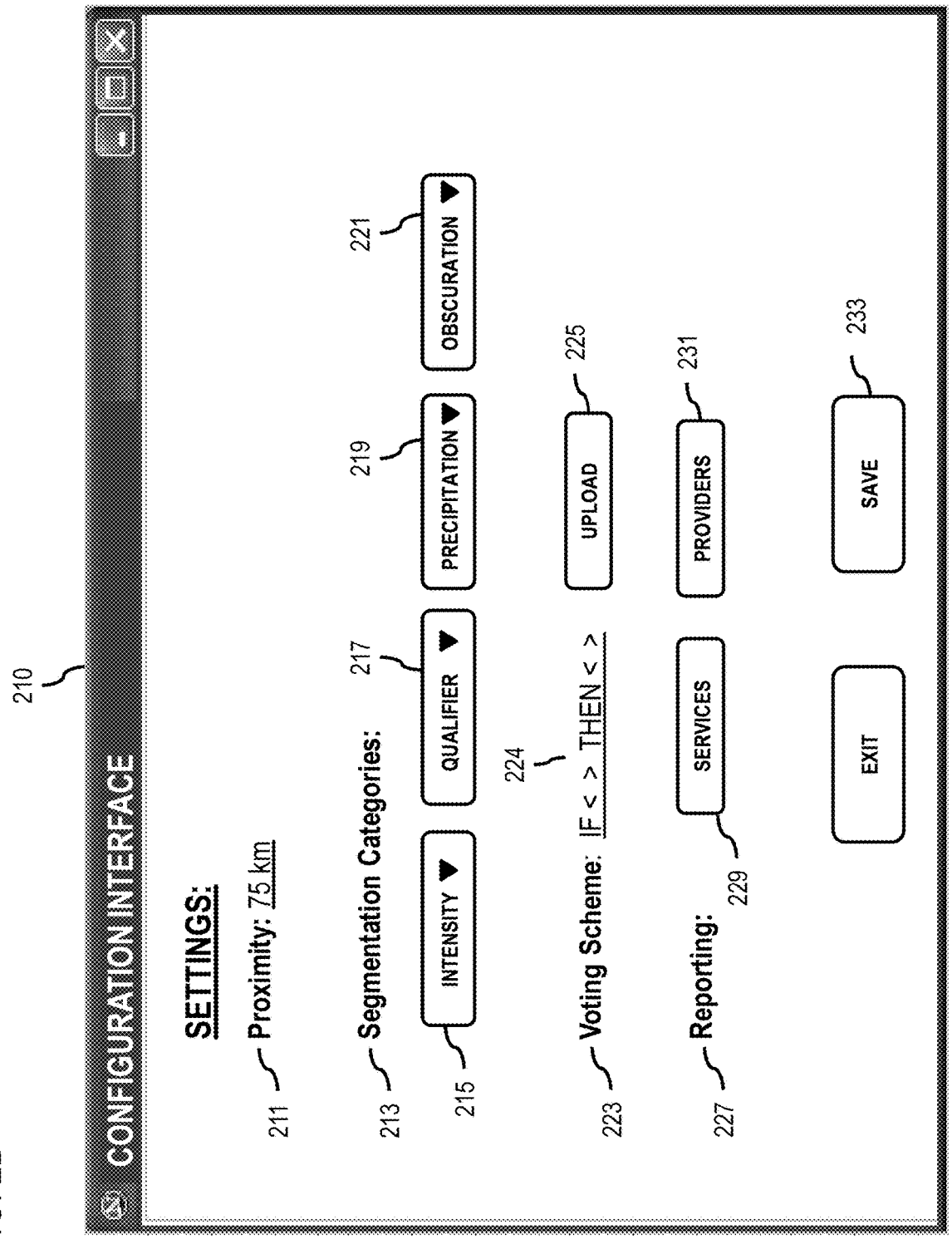

In one embodiment, FIG. 2B depicts a user interface for enabling the service provider to configure execution of the interpolation platform 107. The user interface 210 may be configured in advance of the need for a weather forecast report for a target forecast location 201 lacking a dedicated weather stations 203. Alternatively, the user interface settings may be invoked on demand (as needed). While depicted herein as a standalone interface execution, the configuration settings may be established based on known function calls, native processes, software or hardware operations, network protocols or the like of the service provider, the provider of the weather stations 203, various services 111a-111j of a services platform 113, various content providers 115a-115k, or the like.

The exemplary user interface 210 presents various fields and action buttons for receiving input from the service provider and defining the execution of the interpolation platform 107. For example, the service provider may specify a proximity setting 211 for indicating a weather station 203 search range. Per this setting, the interpolation platform 107 extends outward from the target forecast location to create a search radius encompassing the closest weather stations 203. In certain embodiments, a default proximity (e.g., 75 km) may be presented or the service provider may define a custom value. In FIG. 2A, a search radius 207 is shown to extend outward from the forecast location 201 to encompass weather stations 203a-203c—the closest to the forecast location 201. Weather station 203n is out of range and thus not selected for use in generating an interpolated weather forecast report for the forecast location 201. Per this process, only weather forecast reports received from the closest weather stations 203 are employed for generating the interpolated weather forecast report.

In one embodiment, the search procedure described above may also be executed based on one or more physical characteristics associated with the target forecast location. For example, while not shown for illustrative convenience, an altitude, terrain type or other physical characteristic may also be specified for initiating the weather station 203 search. As such, weather stations 203 matching the selected physical characteristics of the forecast location 201 are identified accordingly. Under this scenario, a weather station 203 within proximity and matching the physical characteristics of the forecast location 201 is identified above one just within range.

In one embodiment, the user interface 210 of FIG. 2B also presents various action buttons 215-221 for specifying different segmentation categories 213. The segmentation categories correspond to those presented in Table 1 above. Per this example, the INTENSITY action button 215 is a drop-down executable for listing the various weather intensity settings reportable by a given weather station 203. The QUALIFIER action button 217 is a drop-down executable for listing different weather qualities and codes/abbreviations thereof. The PRECIPITATION and OBSCURATION action buttons 219 and 221 respectively are drop down executables for listing different precipitation and visibility factors and codes/abbreviations thereof. While not shown, each of the action button 215 may further reveal a field for enabling another category not already defined. For example, the service provider may add or select a "HA" code for denoting hail if such nomenclature is recognized by the weather stations 203.

In one embodiment, defining of the segmentation categories enables the interpolation platform 107 to readily categorize and segment different weather forecast reports received from the selected weather stations 203—i.e., those within the proximate range 207 of the forecast location 201. The service provider may specify a voting scheme 223 by entering various conditional executions, threshold values or other instructions to a voting scheme field 224. For example, the voting scheme 223 may include one or more rules or instructions for defining a segmentation category (forecast parameter) as severe or not. The interpolation platform 107 may specify severity of a given segmentation category IF/WHEN a threshold or conditional value is met. Under this scenario, if a visibility measure indicated in a weather forecast report falls below 4 miles or 60% of a target visibility value, the interpolation platform 107 determines the visibility measure as severe. As another example, if a wind speed measure supersedes a threshold of 45 knots, the interpolation platform 107 may establish the determined wind speed as severe.

Alternatively, the service provider may upload the voting scheme from a file location or data store via an UPLOAD action button 225. The voting scheme 223 dictates a response to or behavior of the interpolation platform 107 to the receipt of a weather forecast report—and specific segmented/forecast parameters within—from a weather station 203. In certain embodiments, the voting scheme settings may also specify one or more severity settings. The severity settings may include one or more rules or instructions for defining a segmentation category (forecast parameter) as severe or not. The voting scheme is maintained by the interpolation platform 107 in the voting scheme database 109 of FIG. 1.

Various reporting settings 227 are also shown in FIG. 2B. The settings include a SERVICE action button 229 and PROVIDERS action button 231 for enabling the service provider to establish the routing or sharing of interpolated weather forecast reports. By way of example, the service provider may specify a data feed or network location to which the interpolated report is to be directed (e.g., a data feed of the service provider), connection settings and sharing preferences between one or more services 111a-111j of a service platform 113 associated with the service provider, connection settings and sharing preferences between one or more content providers 115a-115k associated with the service provider, etc. Also, the reporting settings 227 may specify one or more data sources to retrieve data from, including the network locations of various weather stations 203.

Still further, the reporting settings 227 may include instructions for specifying a frequency of reporting of weather forecast reports. For example, the service provider may establish a 6 hour or 24-hour reporting cycle. This corresponds to a periodicity of refreshing of the interpolated weather forecast report by the interpolation platform 107 accordingly.

In an alternate embodiment (not shown for illustrative convenience), an on-demand report request may be performed via the interface 210 for generating a weather forecast report based on a forecast location. Under this scenario, the service provider enters coordinates representative of the forecast location, the proximity setting 211 and other settings to render an interpolated weather forecast report.

Once the settings are entered via the interface 210, they can be saved by the service provider per the SAVE action button 233. This corresponds to an associating of the settings with a profile maintained by the interpolation platform 107 for the service provider. As such, the settings are established for enabling ongoing execution or integration of the interpolation platform 107 by the service provider for rendering weather forecast reports. In the embodiments above, the actions taken by the service provider via the interface 210 may be synonymous with those of a consumer or user. For example, the interpolation platform 107 and its interface 210 may be employed by a user of a weather service of the service provider. As such, the interpolation platform 107 may be integrated as an additional feature or third-party service of the weather service or as a service 111a-111j of a services platform 113 or content provider 115a-115k accordingly.

In one embodiment, weather stations 203a-203c send weather forecast reports to the interpolation platform 107. FIG. 2C illustrates an exemplary weather forecast report 234 generated by a weather station 203. It is presented, for example, in a markup language format having tags and labels for defining various weather forecast attributes. Other formats may be employed by the weather stations 203 accordingly. In this example, one section 239 of the weather forecast report 234 specifies attributes of the weather station, including the weather station identifier, time information, latitude and longitude, etc. Another section 241 specifies wind characteristics for the forecast location 205 associated with the weather station 203, visibility, sky condition, etc. In another section 243 of the weather forecast report, additional temperature and precipitation characteristics are specified. Within each weather forecast report 234 generated for a specific forecast location 205, forecast parameters are specified between the "wx_string" tags, i.e., tag 237. Additional forecast parameters may also be annotated between the tags labeled as "wind_speed_kt" for wind speed in knots, "wind_dir_degrees" for wind direction in degrees, "visibility_statute_mi" for visibility in miles, etc.

The interpolation platform 107 segments the weather forecast reports 234 as transmitted based on the defined segmentation categories 213 of FIG. 2B (per Table 1 as described above). For example, tag 237 of the weather forecast report 234 of FIG. 2C reads as <wx_string>RA</wx_string>, which according to the defined precipitation parameter indicates "rain" with no intensity ("+" or "−") defined. As another example, a tag reading <wx_string>-RA BR</wx_string> indicates an intensity parameter of "light," a precipitation parameter of "rain" and an obscuration parameter of "mist." Thus, the interpolation platform 107 segments the various reports based on the identified forecast parameters contained in the report. It is noted that the forecast parameters/categories correspond to those for indicating severe weather conditions.

In one embodiment, the interpolation platform 107 executes the voting scheme as established per the voting scheme 223 settings of FIG. 2B. The voting scheme is executed to select the severe notification forecast parameters to be used from the several possible severe reports obtained within a specified period. Furthermore, the voting scheme is executed by the interpolation platform 107 to decide upon which specific segmented forecast parameters amongst the many reported is to be used for generating the interpolated weather forecast report.

An exemplary use case is presented below for illustrating the logical voting scheme procedure executed by the interpolation platform 107. Per this scenario, the interpolation platform 107 receives four weather forecast reports within six hours from the same weather station, e.g., weather station 203a of FIG. 2A. The weather reports are sent as depicted in FIG. 2C in response to a request for a weather forecast report for a target location 201. The reports include tags for indicating various severe weather forecast parameters and is depicted in Table 2 below:

TABLE 2

| Report # | Time Sent | Report Includes | Which Indicates |
|---|---|---|---|
| 1 | 02:01:13 | <wx_string>-RA FG</wx_string> | //light rain and fog |

TABLE 2-continued

| Report # | Time Sent | Report Includes | Which Indicates |
|---|---|---|---|
| 2 | 03:53:18 | <wx_string>+SN</wx_string> | //heavy snow |
| 3 | 04:57:25 | <wx_string>+SN </wx_string> | //heavy snow |
| 4 | 06:18:22 | <wx_string>+SN </wx_string> | //heavy snow |

In this case, the vote on the intensity parameter among the four reports respectively is "−", "+", "+" and "+". As "+" indicates high intensity is the most prevalent reported intensity, the interpolation platform 107 may conclude heavy intensity. Similarly, the vote on the precipitation parameter would be concluded as snow since SN is indicated via the reports 3 out of 4 times during the period as opposed to one indication of rain (i.e., RA). Still further, the vote on the obscuration parameter indicates only one fog observation. Thus, the interpolated weather forecast report generated based on these findings would be "Heavy Snow and Fog." As such, "Heavy Snow and Fog" would be the determined weather forecast for the target forecast location 201 of FIG. 2A when based solely on single weather station 203a. In the case where a tie occurs, a tie breaking scheme may be applied, such as selection of a worst-case weather parameter.

As a further exploration of the above described use case, four weather forecast reports may be presented within the same period by each of weather stations 203b and 203c in addition to those provided by weather station 203a above. This corresponds to all the weather stations 203 within range 207 of the target forecast location 201. Under this scenario, the interpolation platform 107 executes the same voting scheme procedure as above for each individual forecast location, resulting in generation of an interpolated weather forecast report for each location/weather station. The interpolated weather forecasts are depicted in Table 3 as follows:

TABLE 3

| Forecast Location/Weather Station | Interpolated Weather Report |
|---|---|
| 205a/203a | "Heavy Snow and Fog" |
| 205b/203b | "Heavy Snow and Fog" |
| 205c/203c | "Heavy Snow" |

Based on the results above, the interpolation platform 107 may execute additional voting to determine a best case final interpolated weather forecast of from amongst all the reports. In this case, "Heavy Snow and Fog" is the most prevalent weather forecast report so it is selected by the interpolation platform 107 as the weather forecast for forecast location 201. Additional elements of the report (not shown for illustrative purposes) may also be presented based on the segmented weather forecast reports received from respective weather stations 203. In one embodiment, the resulting interpolated weather forecast report may be stored, such as to a geographic database 117, and rendered for presentment to a user of a mobile device.

Figure 2D:
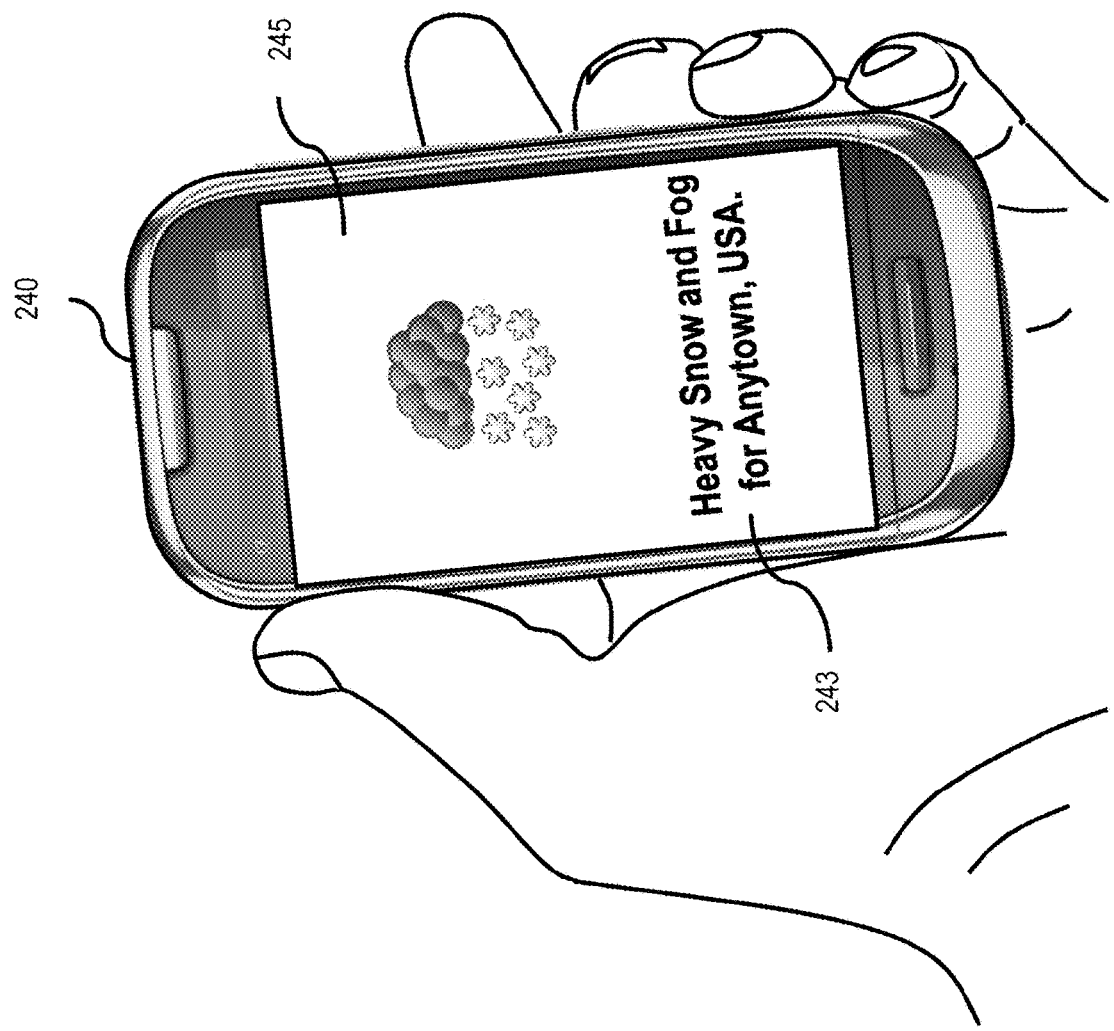

In FIG. 2D, an exemplary mobile device 240 accesses the weather service via an application 245 or widget of the service provider to acquire weather forecast report for Anytown, USA—i.e., the hypothetical forecast location 201 of FIG. 2A having no direct weather station. To fulfill the request, the service provider accesses the interpolation platform 107 to generate the interpolated weather forecast report for Anytown, USA from the geographic database 117. Alternatively, the interpolation platform 107 retrieves the most recently stored report(s) for Anytown, USA. The report is then presented as a message 243 indicating "Heavy Snow and Fog."

It is noted the reliability of the interpolated weather forecast report for a given forecast location increases as the number of weather stations included in the segmentation/reporting cycle increases. In the exemplary embodiments described herein, the interpolation platform 107 compensates for the limited number of weather stations 203 directly within the forecast location 201 through one or more of: (1) expansion of the weather station 203 reporting range 207 and (2) an increased pool of segmented reports from which to vote upon.

In one embodiment, the interpolation platform 107 performs the processes of interpolating weather forecast reports for forecast locations having limited weather station access with respect to the various embodiments described herein. By way of example, the interpolation platform 107 can be a standalone server or a component of another device with connectivity to the communication network 105. For example, the component can be part of an edge computing network where remote computing devices (not shown) are installed along or within proximity of a given geographical area to provide weather provider/weather station monitoring for weather data collected locally or within a local area served by the remote or edge computing device.

In one embodiment, a weather station can be any device equipped with one or more of the weather sensors discussed above. By way of example, such a device can be any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the device can support any type of interface to the user (such as "wearable" circuitry, etc.).

The communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the interpolation platform 107 may be a platform with multiple interconnected components. The interpolation platform 107 may include multiple servers, intelligent networking devices, computing devices, components and corresponding software for detecting quality weather providers 101, weather stations 103, and/or weather reports. In addition, it is noted that the interpolation platform 107 may be a separate entity of the system 100, a part of one or more services 111*a*-111*j* (collectively referred to as services 111) of the services platform 113, or included within the weather stations 103.

The services platform 113 may include any type of service 111. By way of example, the services 111 may include weather services, mapping services, navigation services, travel planning services, notification services, social networking services, content (e.g., audio, video, images, etc.) provisioning services, application services, storage services, contextual information determination services, location based services, news services, etc. In one embodiment, the services platform 113 may interact with the interpolation platform 107, the weather providers 101, the weather stations 103, and/or one or more content providers 115*a*-115*k* (also collectively referred to as content providers 115) to provide the services 111.

In one embodiment, the content providers 115 may provide content or data to the weather providers 101, the interpolation platform 107, and/or the services 111. The content provided may be any type of content, such as historical weather data for the weather stations 103, mapping content, textual content, audio content, video content, image content, etc. In one embodiment, the content providers 115 may provide content that may aid in the detecting quality weather providers 101, weather stations 103, and/or weather reports according to the various embodiments described herein. In one embodiment, the content providers 115 may also store content associated with the weather stations 103, the interpolation platform 107, and/or the services 111. In another embodiment, the content providers 115 may manage access to a central repository of data, and offer a consistent, standard interface to data, such as a repository of historical or current weather data, probe data, probe features/attributes, link features/attributes, etc.

By way of example, the weather providers 101, weather stations 103, interpolation platform 107, services platform 113, and/or the content providers 115 communicate with each other and other components of the system 100 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 3:
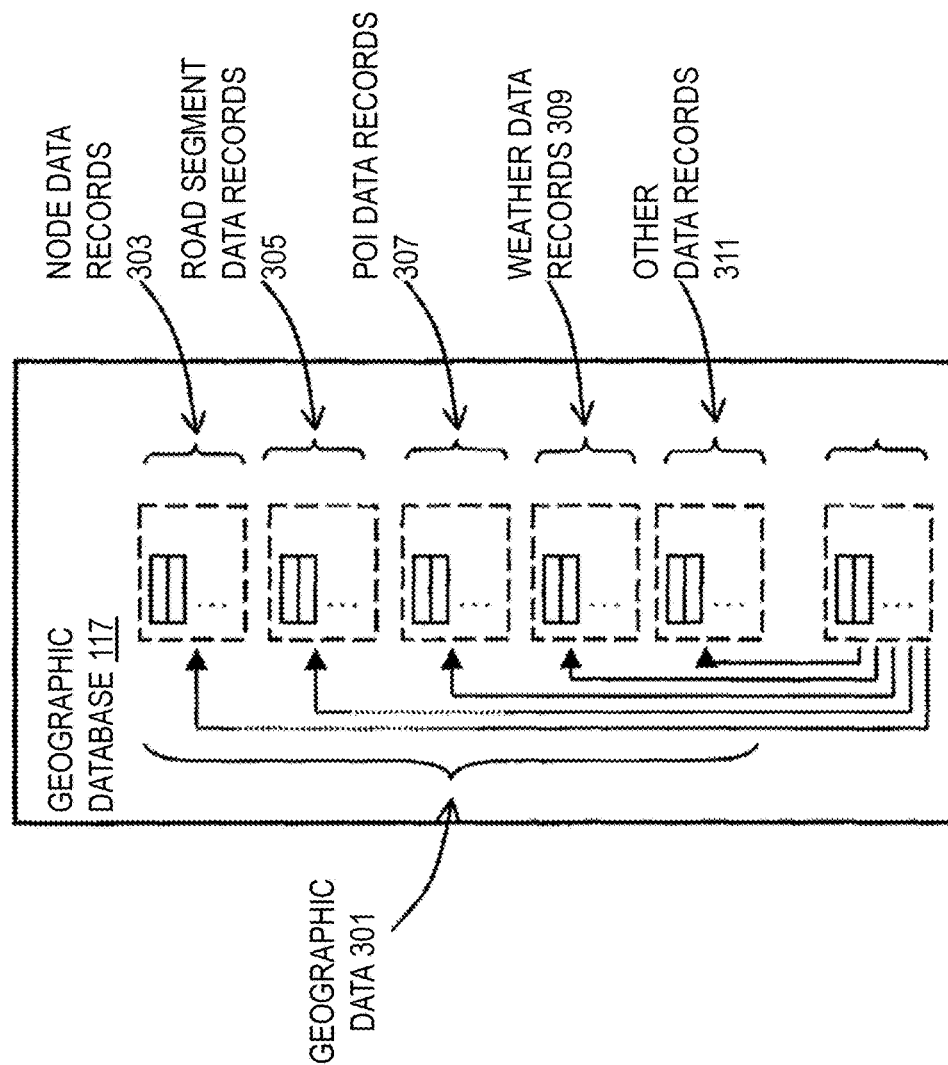
FIG. 3 is a diagram of a geographic database, according to one embodiment.

FIG. 3 is a diagram of the geographic database 117 of system 100, according to exemplary embodiments. In the exemplary embodiments, weather data generated by the weather stations 103 can be stored, associated with, and/or linked to the geographic database 117 or data thereof. In one embodiment, the geographic database 117 includes geographic data 301 used for (or configured to be compiled to be used for) mapping and/or navigation-related services, such as for personalized route determination, according to exemplary embodiments. For example, the geographic database 117 includes node data records 303, road segment or link data records 305, POI data records 307, weather data records 309, and other data records 311, for example. More, fewer or different data records can be provided. In one embodiment, the other data records 311 include cartographic ("cartel") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using the point-based map matching embodiments describes herein), for example.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three dimensional polygon extrusions, models, routes, etc. Accordingly, the terms polygons and polygon extrusions/models as used herein can be used interchangeably.

In one embodiment, the following terminology applies to the representation of geographic features in the geographic database 117.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 117 follows certain conventions. For example, links do not cross themselves and do not cross each other except at a node or vertex. Also, there are no duplicated shape points, nodes, or links. Two links that connect each other have a common node or vertex. In the geographic database 117, overlapping geographic features are represented by overlapping polygons. When polygons overlap, the boundary of one polygon crosses the boundary of the other polygon. In the geographic database 117, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

In exemplary embodiments, the road segment data records 305 are links or segments representing roads, streets, or paths, as can be used in the calculated route or recorded route information for determination of one or more personalized routes, according to exemplary embodiments. The node data records 303 are end points or vertices corresponding to the respective links or segments of the road segment data records 305. The road link data records 305 and the node data records 303 represent a road network, such as used by vehicles, cars, and/or other entities. Alternatively, the geographic database 117 can contain path segment and node data records or other data that represent pedestrian paths or areas in addition to or instead of the vehicle road record data, for example. In one embodiment, the road or path segments can include an altitude component to extend to paths or road into three-dimensional space (e.g., to cover changes in altitude and contours of different map features, and/or to cover paths traversing a three-dimensional airspace).

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 117 can include data about the POIs and their respective locations in the POI data records 307. The geographic database 117 can also include data about places, such as cities, towns, or other communities, and other geographic features, such as bodies of water, mountain ranges, etc. Such place or feature data can be part of the POI data records 307 or can be associated with POIs or POI data records 307 (such as a data point used for displaying or representing a position of a city).

In one embodiment, the geographic database 117 includes weather data records 309 which store weather data reports and/or related probe point data. For example, the weather data records 309 can store map matching results for individual weather reports. These results can indicate, for instance, a specific road or link on which the weather data was collected, a determined transportation mode, a presence of covered map features (e.g., a tunnel), nearby weather stations 103 available for performing station to station checks, etc.

The geographic database 117 can be maintained by the content provider 115 in association with the services platform 113 (e.g., a map developer). The map developer can collect geographic data to generate and enhance the geographic database 117. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 117 can be a master geographic database stored in a format that facilitates updating, maintenance, and development. For example, the master geographic database 117 or data in the master geographic database 117 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

Figure 4:
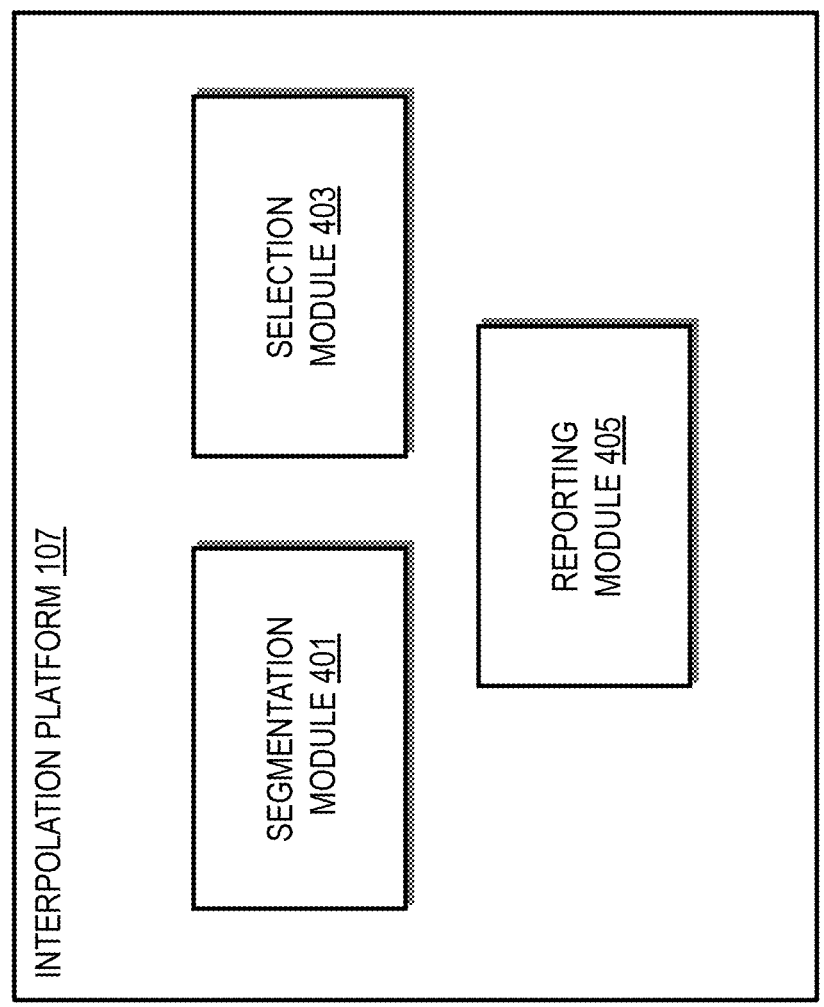
FIG. 4 is a diagram of the components of an interpolation platform, according to one embodiment.

FIG. 4 is a diagram of the components of an interpolation platform, according to one embodiment. By way of example, the interpolation platform 107 includes one or more components for interpolating a weather forecast report having limited weather station access according to the various embodiments described herein. It is contemplated that the functions of these components may be combined or performed by other components of equivalent functionality. In this embodiment, the interpolation platform 107 includes a segmentation module 401, a selection module 403, and a reporting module 405. The above presented modules and components of the interpolation platform 107 can be implemented in hardware, firmware, software, or a combination thereof. Though depicted as a separate entity in FIG. 1, it is contemplated that the interpolation platform 107 may be implemented as a module of any of the components of the system 100 (e.g., a component of the services platform 113, the weather stations 103, the weather providers 101, etc.). In another embodiment, one or more of the modules 401, 403, and 405 may be implemented as a cloud based service, local service, native application, or combination thereof.

Figure 5A:
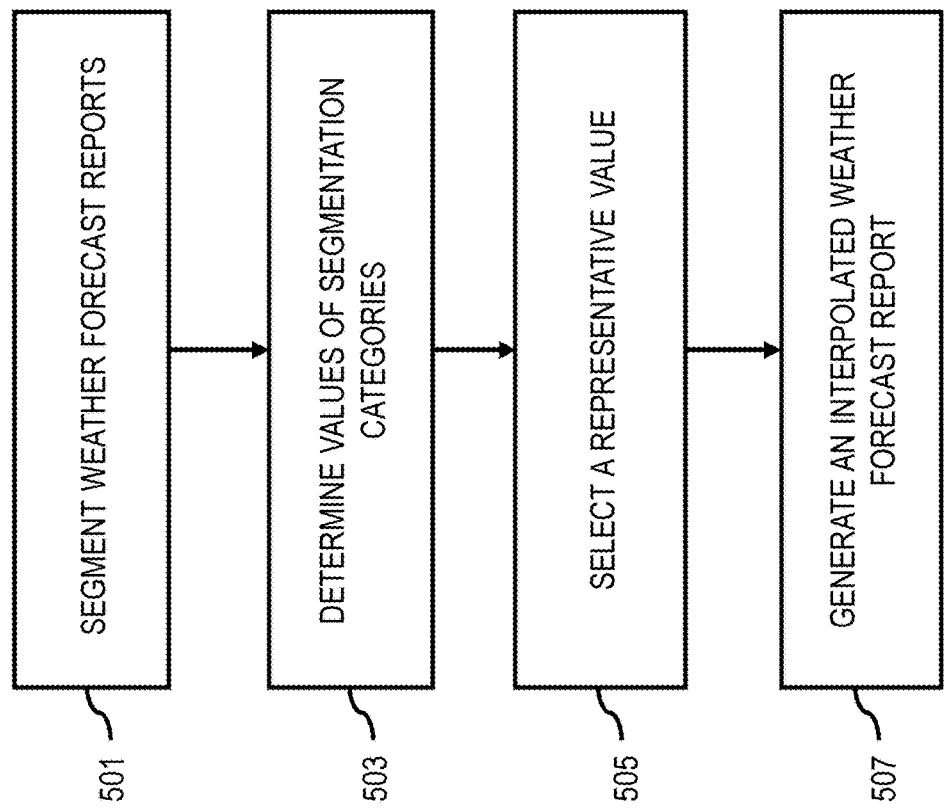
FIGS. 5A-5C are flowcharts of a process for interpolating weather forecast reports for forecast locations having limited weather station access, according to one embodiment.
Figure 5C:
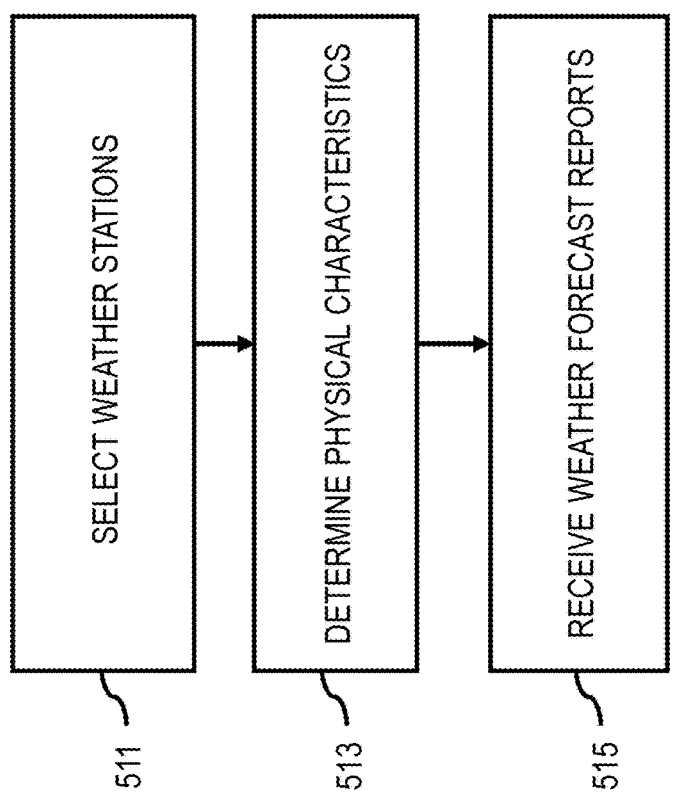

The functions of these modules are discussed with respect to FIGS. 5A-5C below. In one embodiment, the processes of FIGS. 5A-5C can be performed in combination as part of an overall approach for interpolating weather forecast reports for forecast locations having limited weather station access. In addition or alternatively, any of the processes can FIGS. 5A-5C can be performed independently.

Figure 7:
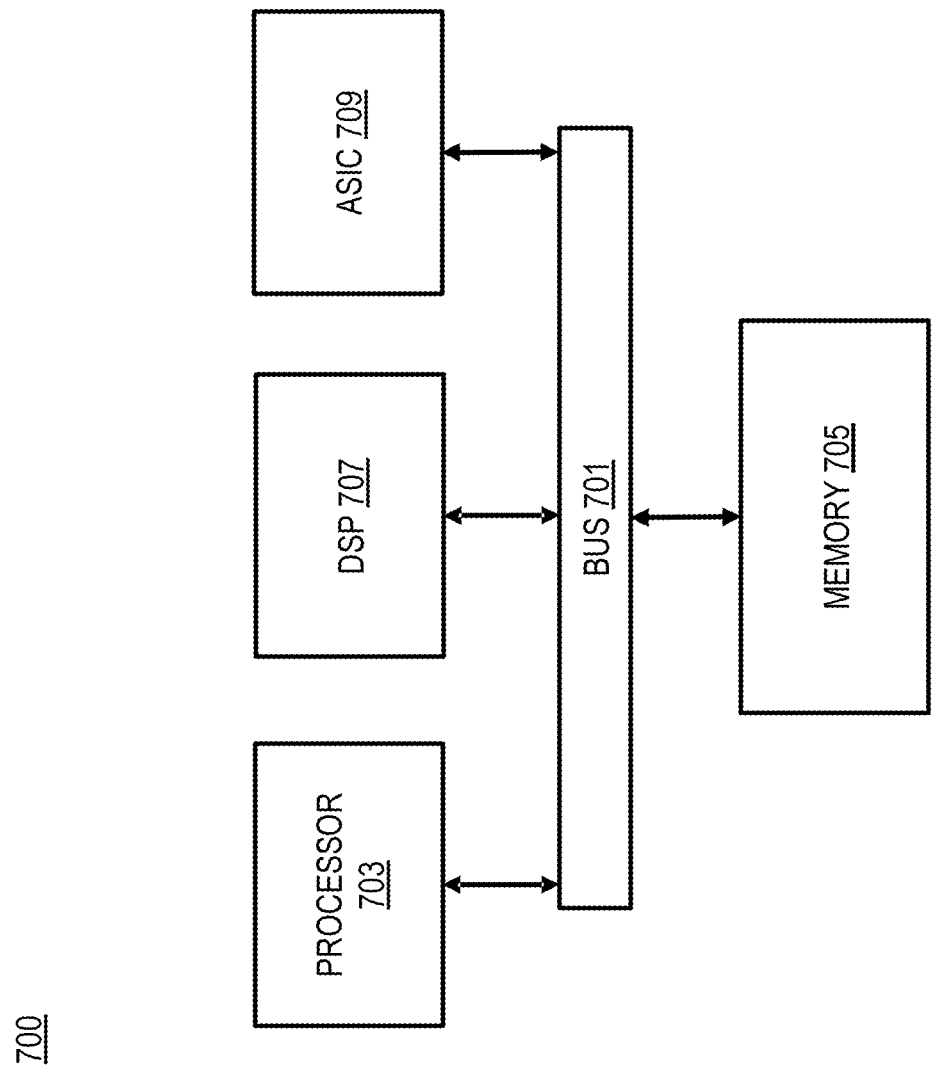
FIG. 7 is a diagram of a chip set that can be used to implement an embodiment of the invention.

In various embodiments, the interpolation platform 107 and/or any of the modules 401, 403, and 405 of the interpolation platform 107 as shown in FIG. 4 may perform one or more portions of process 500. The process may be implemented in, for instance, a chip set including a processor and a memory as shown in FIG. 7. As such, the interpolation platform 107 and/or the modules 401, 403, and 405 can provide means for accomplishing various parts of the process 500, as well as means for accomplishing embodiments of other processes described herein in conjunction with other components of the system 100. Although the process 500 is illustrated and described as a sequence of steps, its contemplated various embodiments of the process 500 may be performed in any order or combination and need not include all the illustrated steps.

In step 501, the segmentation module 401 segments a plurality of weather forecast reports according to a plurality of segmentation categories, the plurality of segmentation categories representing respective one or more forecast parameters. In another step 503, the segmentation module 401 determines respective values of the plurality of segmentation categories from each of the plurality of weather forecasts. As noted previously, the one or more forecast parameters of the plurality of segmentation categories include a weather intensity parameter, a weather qualifier parameter, a precipitation parameter, an obscuration parameter, or a combination thereof.

In step 505, the selection module 403 selects a representative value from the respective values for each of the one or more segmentation categories. The respective values of the plurality of segmentation categories are determined by parsing the plurality of weather forecasts for one or more tags corresponding to the plurality of segmentation categories, and wherein the respective values are specified within the one or more tags. The one or more tags specify the respective values for said each of the plurality of segmentation categories from respective sets of possible values for said each of the plurality of segmentation categories.

Figure 5B:
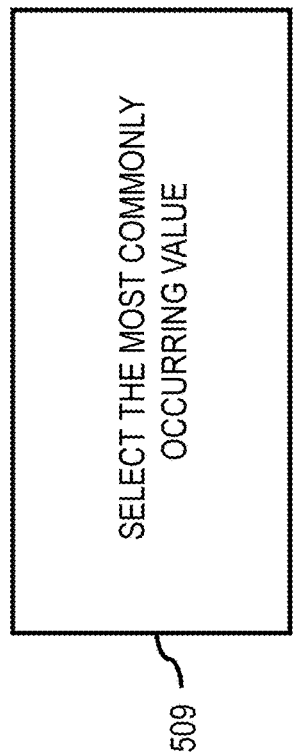

In a related step to step 505, the selection module 403 performs step 509 of process 508 (FIG. 5B). In step 509, the selection module 403 selects the most commonly occurring value that corresponds to a more severe weather condition as the representative value. As noted previously, the selecting of the representative value is based on a voting scheme, wherein the voting scheme selects a most commonly occurring value of the respective values as the representative value for said each of the plurality of segmentation categories. The voting scheme selects one of the respective values as the representative value when the selected one of the respective values corresponds to a longest duration weather event predicted by the plurality of weather forecast reports to occur for a period into the future. Alternatively, the voting scheme selects one of the respective values as the representative value when the selected one of the respective values corresponds to a latest weather event reported in the plurality of weather forecast reports. It is noted, in certain embodiments, that steps 501, 503, 505, and 507 of process 500 and step 509 of process 508 are cooperatively executed by the segmentation module 401 and selection module 403 accordingly.

Referring again to FIG. 5A, in step 507 the reporting module 405 combines the representative value for said each of the plurality of segmentation categories to generate an interpolated weather forecast report. The interpolated weather forecast report is generated for a target location and may be stored for subsequent retrieval, such as to a geographic database 117. Alternatively, the interpolated weather forecast report may be rendered to a user interface of a weather service provider or content provider in response to a request for a weather forecast report for the target location.

In step 511 of process 510 (FIG. 5C), the selection module 403 selects one or more weather stations within proximity of the target location. In another step 513, the selection module 403 determines one or more physical characteristics of the target location. As noted previously, the one or more weather stations are further selected by matching the one or more physical characteristics of the target location against one or more other physical characteristics of respective locations of the one or more weather stations. By way of example, the one or more physical characteristics include at least an altitude.

In step 515, the selection module receives the plurality of weather forecast reports from the one or more weather stations. It is noted that matching of the physical characteristics of the target location and respective locations of the one or more weather stations increases the reliability of weather station selection, the relevancy of the weather forecast reports shared and the likelihood of network connectivity between the weather stations and the interpolation platform.

The processes described herein for interpolating a weather forecast report for a forecast location having limited weather station access may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
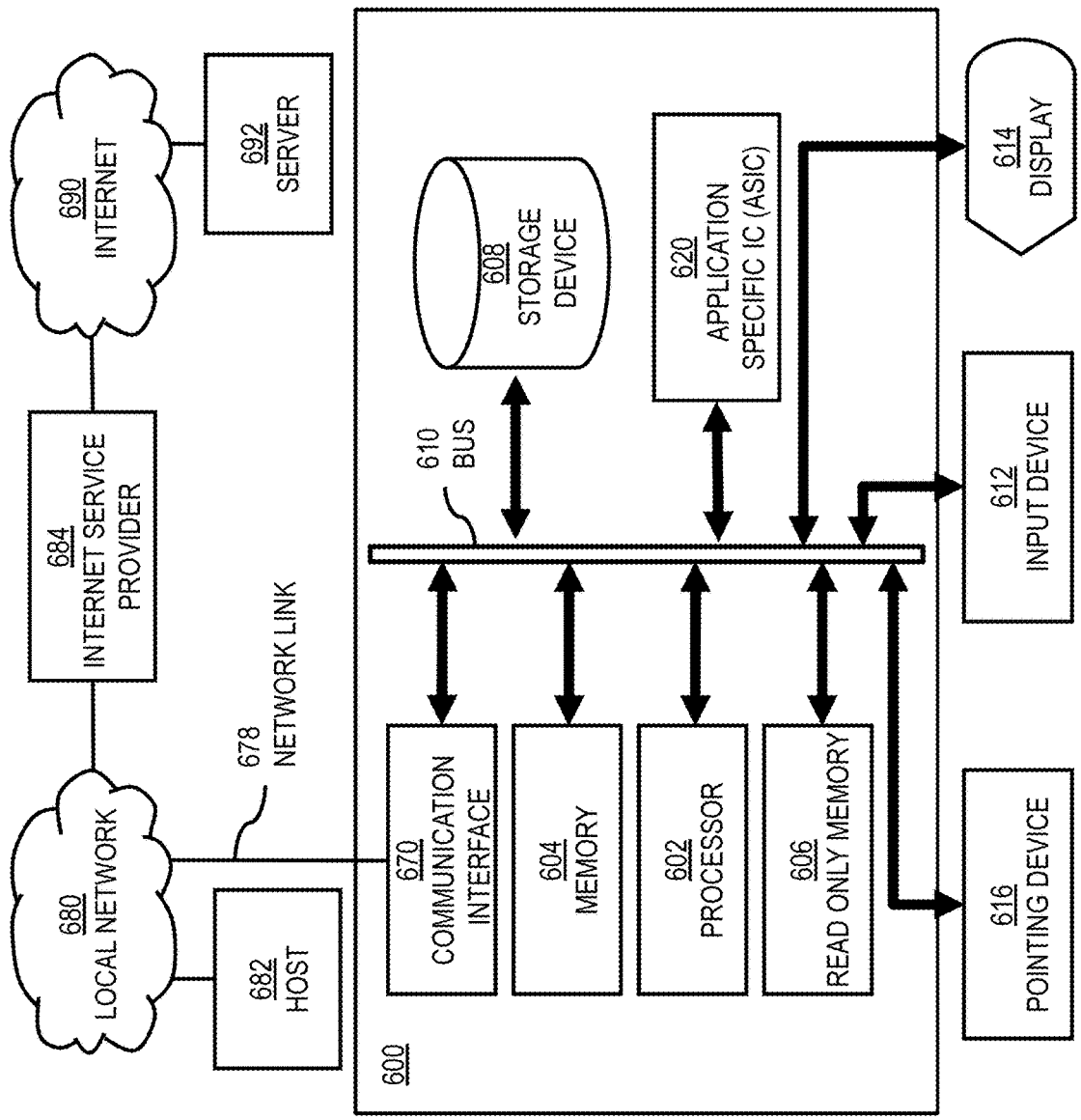
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to interpolate a weather forecast report for a forecast location having limited weather station access as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of interpolating a weather forecast report for a forecast location having limited weather station access.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to interpolate a weather forecast report for a forecast location having limited weather station access. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for interpolating a weather forecast report for a forecast location having limited weather station access. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for interpolating a weather forecast report for a forecast location having limited weather station access, is provided to the bus 610 for use by the processor from an external input device 612, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general, the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for interpolating a weather forecast report for a forecast location having limited weather station access.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to interpolate a weather forecast report for a forecast location having limited weather station access as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of interpolating a weather forecast report for a forecast location having limited weather station access.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to interpolate a weather forecast report for a forecast location having limited weather station access. The memory 705 also stores the data associated with or generated by the execution of the inventive steps.

Figure 8:
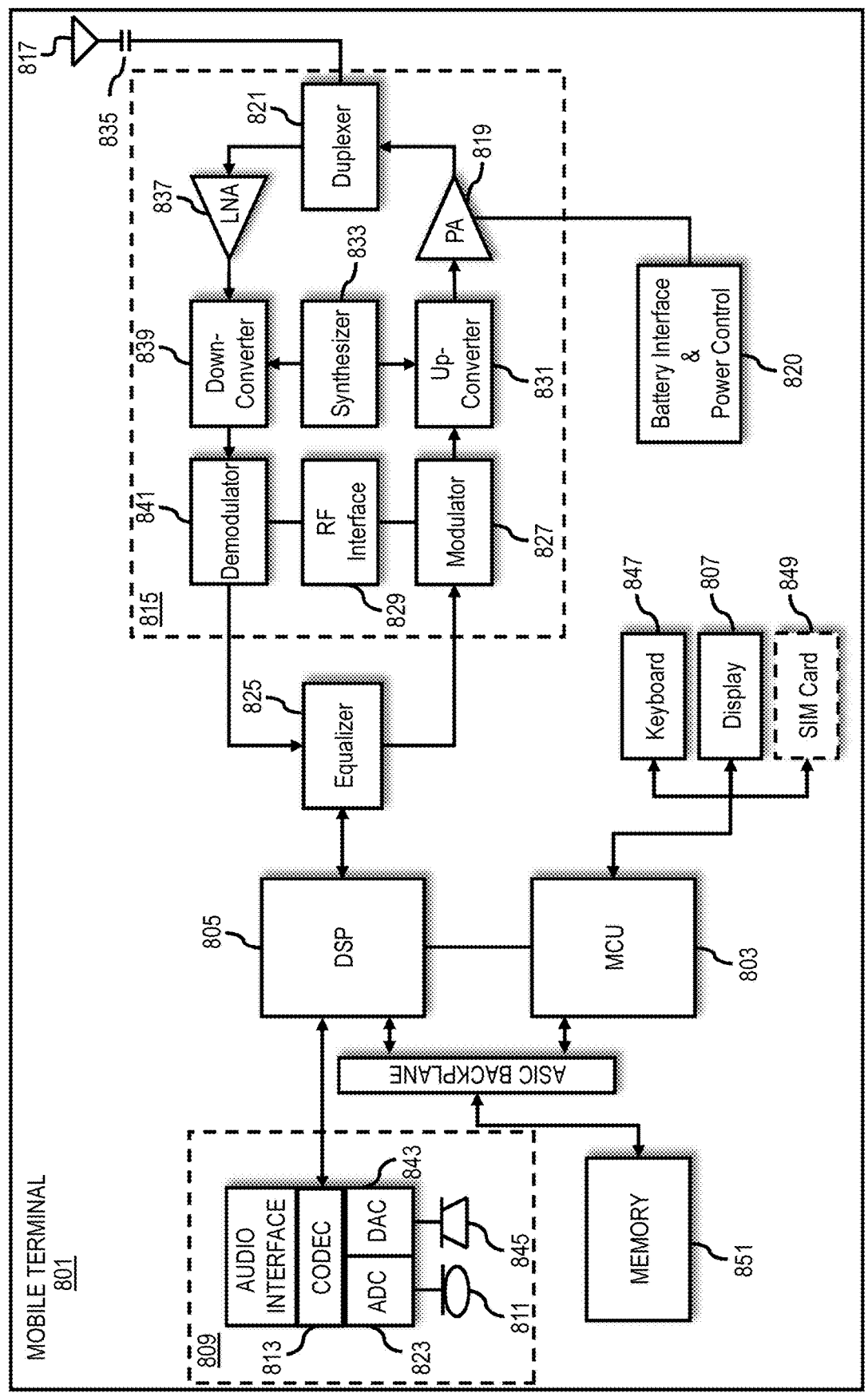
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of interpolating a weather forecast report for a forecast location having limited weather station access. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of interpolating a weather forecast report for a forecast location having limited weather station access. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to interpolate a weather forecast report for a forecast location having limited weather station access. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   segmenting a plurality of weather forecast reports based on a plurality of segmentation categories, the plurality of segmentation categories representing respective one or more forecast parameters, wherein the one or more forecast parameters include a weather intensity parameter and a weather obscuration parameter, wherein the weather intensity parameter specifies degree of intensity of a weather condition, and wherein the weather obscuration parameter specifies degree of visibility with respect to precipitation;
   determining respective values of the plurality of segmentation categories from each of the segmented weather forecast reports;
   selecting a representative value from the respective values for each of the plurality of segmentation categories; and
   combining the representative value for each of the plurality of segmentation categories to generate an interpolated weather forecast report.

2. The method of claim 1, wherein the selection of the representative value is based on a voting scheme, and wherein the voting scheme selects a most commonly occurring value of the respective values as the representative value for each of the plurality of segmentation categories.

3. The method of claim 2, wherein the voting scheme selects one of the respective values as the representative value when the selected one of the respective values corresponds to a longest duration weather event predicted by the plurality of weather forecast reports to occur for a period of time into the future.

4. The method of claim 2, wherein the voting scheme selects one of the respective values as the representative value when the selected one of the respective values corresponds to a latest weather event reported in the plurality of weather forecast reports.

5. The method of claim 2, further comprising:
   determining a severe weather condition according to a predetermined threshold value; and
   selecting the most commonly occurring value from the one or more commonly occurring values as the representative value, wherein the representative value corresponds to a severe weather condition.

6. The method of claim 1, wherein the interpolated weather forecast is generated for a target location, the method further comprising:
   selecting one or more weather stations based, at least in part, on a distance threshold from the target location; and
   receiving the plurality of weather forecast reports from the one or more weather stations.

7. The method of claim 6, further comprising:
   determining one or more physical characteristics of the target location,
   wherein the one or more weather stations are further selected by matching the one or more physical characteristics of the target location against one or more other physical characteristics of respective locations of the one or more weather stations.

8. The method of claim 7, wherein the one or more physical characteristics include an altitude, and wherein the altitude extends the physical characteristics of the target location into a three-dimensional space.

9. The method of claim 1, further comprising:
   parsing the plurality of weather forecasts for one or more tags corresponding to the plurality of segmentation categories, wherein the respective values are specified within the one or more tags.

10. The method of claim 9, wherein the one or more tags specify the respective values for each of the plurality of segmentation categories from respective sets of possible values.

11. The method of claim 9, wherein the one or more tags indicate the weather intensity parameter, the weather obscuration parameter, or the combination thereof.

12. The method of claim 1, wherein the weather intensity parameter specifies a zero intensity, a light intensity, a heavy intensity, or a normal intensity, and wherein the weather obscuration parameter specifies a fog, a mist, or a haze.

13. The method of claim 1, further comprising:
   specifying a data feed or a network location for distributing the interpolated weather forecast report; and
   specifying a frequency of reporting the interpolated weather forecast report, wherein the frequency of reporting corresponds to a periodicity of refreshing the interpolated weather forecast report.

14. An apparatus comprising:
   at least one processor; and
   at least one memory including computer program code for one or more programs,
   the at least one memory and the computer program code configured to, with the at least one processor, cause the apparatus to perform at least the following,
      segment a plurality of weather forecast reports based on a plurality of segmentation categories, the plurality of segmentation categories representing respective one or more forecast parameters, wherein the one or more forecast parameters include a weather intensity parameter and a weather obscuration parameter, wherein the weather intensity parameter specifies degree of intensity of a weather condition, and wherein the weather obscuration parameter specifies degree of visibility with respect to precipitation;
      determine respective values of the plurality of segmentation categories from each of the segmented weather forecast reports;
      select a representative value from the respective values for each of the plurality of segmentation categories; and
      combine the representative value for each of the plurality of segmentation categories to generate an interpolated weather forecast report.

15. The apparatus of claim 14, wherein the selection of the representative value is based on a voting scheme, and wherein the voting scheme selects a most commonly occurring value of the respective values as the representative value for each of the plurality of segmentation categories.

16. The apparatus of claim 15, wherein the apparatus is further caused to:
   determine a severe weather condition according to a predetermined threshold value; and
   select the most commonly occurring value from the one or more commonly occurring values as the representative value, wherein the representative value corresponds to a severe weather condition.

17. A non-transitory computer-readable storage medium carrying one or more sequences of one or more instructions which, when executed by one or more processors, cause an apparatus to at least perform the following steps:
 segmenting a plurality of weather forecast reports based on a plurality of segmentation categories, the plurality of segmentation categories representing respective one or more forecast parameters, wherein the one or more forecast parameters include a weather intensity parameter and a weather obscuration parameter, wherein the weather intensity parameter specifies degree of intensity of a weather condition, and wherein the weather obscuration parameter specifies degree of visibility with respect to precipitation;
 determining respective values of the plurality of segmentation categories from each of the segmented weather forecast reports;
 selecting a representative value from the respective values for each of the plurality of segmentation categories; and
 combining the representative value for each of the plurality of segmentation categories to generate an interpolated weather forecast report.

18. The non-transitory computer-readable storage medium of claim 17, wherein the apparatus is further caused to perform:
 determining a severe weather condition according to a predetermined threshold value; and
 selecting a most commonly occurring value from the one or more commonly occurring values as the representative value, wherein the representative value corresponds to a severe weather condition.

19. The non-transitory computer-readable storage medium of claim 17, wherein a first set of weather station include at least one mobile weather station, and wherein the apparatus is further caused to perform:
 selecting the first set of weather station based, at least in part, on a distance threshold from a target location; and
 receiving the plurality of weather forecast reports from the first set of weather station.

* * * * *